Patented May 10, 1938

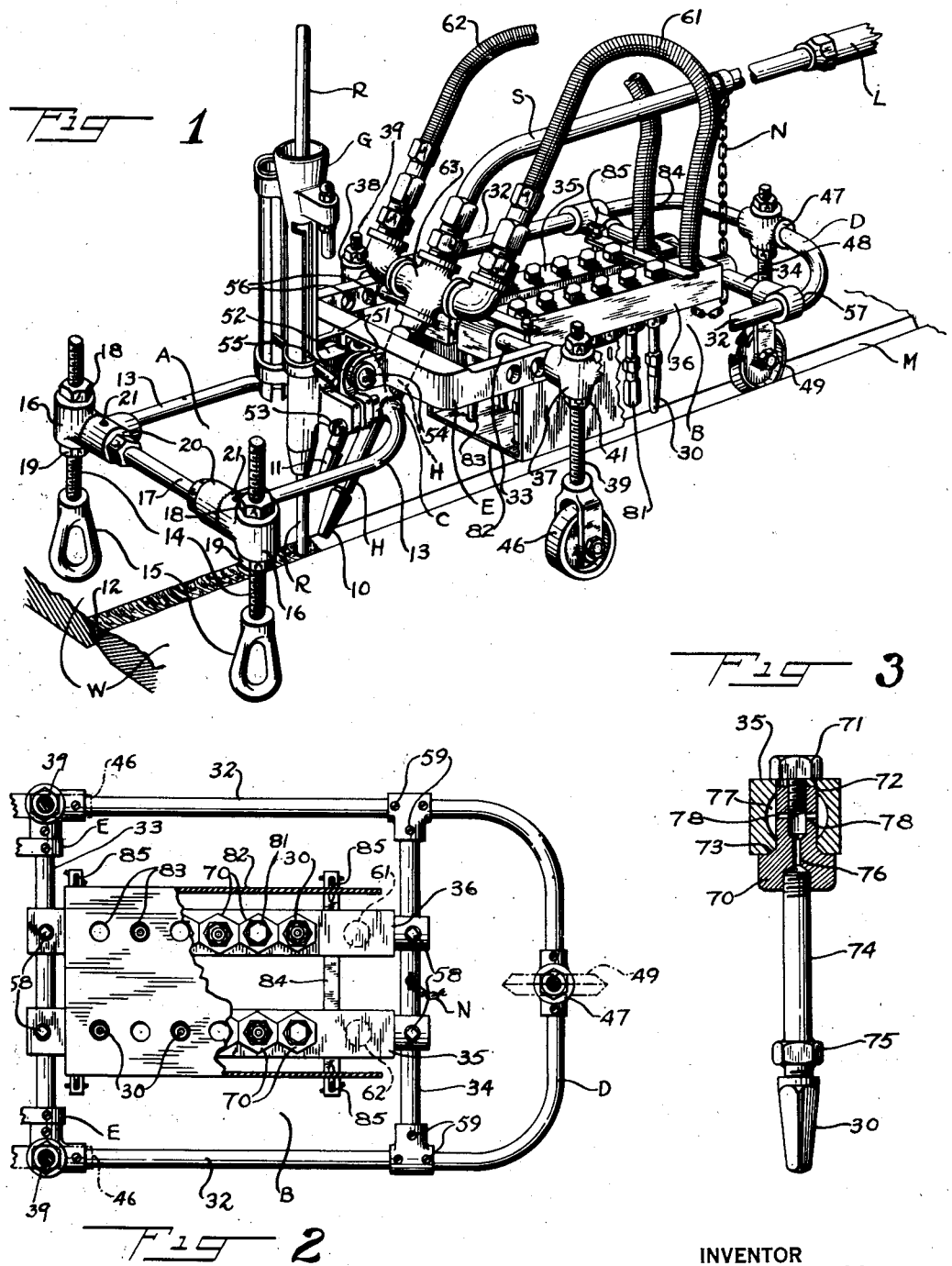

2,116,870

UNITED STATES PATENT OFFICE 2,116,870

WELDING APPARATUS

Harry E. Rockefeller, New York, N. Y., and John M. Halbing, Bloomfield, N. J., assignors, by mesne assignments, to Union Carbide and Carbon Corporation, a corporation of New York Application December 6, 1933, Serial No. 701,112

31 Claims. (Cl. 113—59)

This invention relates to an improved manually-operable welding apparatus having an independent unit for insuring effective and adequate preheating of the work irrespective of the movement of the welding apparatus relative to the work.

Preheating jets already have been used with welding apparatus to raise the temperature of the edges of a seam to be welded so as to insure a sound and firm deposit when molten metal is added thereto. The nozzles employed heretofore to perform the preheating function have been attached in many instances directly to the welding head and so, for the sake of convenience and accuracy in their use, they have been limited both as to size and number. Further, when the preheating nozzles are attached to the welding head and the welding apparatus is raised and lowered intermittently in the usual manner to unite the added metal and the edges of a seam, they are moved away from the work a considerable portion of the time during a welding operation, and the maximum amount of heat produced by the jets issuing from the preheating nozzles is not effectively utilized, thereby tending to impair the quality of the weld produced.

An object of this invention is to provide an improved welding apparatus in which the work-preheating jets are more effectively utilized for directing high-temperature heat on the work ahead of the welding region.

Another object of this invention is to provide an improved welding apparatus in which any desired amount of high-temperature heat can be produced and directed upon the work ahead of the welding region.

Still another object of this invention is to provide an improved welding apparatus having a preheating unit which will remain at a constant distance with respect to the work, and having a welding unit connected thereto and rockably movable in a manner to vary at will the distance of the source of welding heat from the work.

And still another object is to provide a novel welding apparatus in which a welding head is supported above the work independently of a work preheating unit associated therewith, and which combination of apparatus is self-supporting on the surface of the work.

These objects and others together with the novel features of this invention will be more apparent from the following description and the accompanying drawing, of which Fig. 1 is a perspective view of a welding apparatus embodying the principles of this invention;

Fig. 2 is a view of a portion of the underside of the preheating unit of the apparatus illustrated in Fig. 1, parts being broken away and other parts shown in section; and Fig. 3 is a transverse sectional view through a preheater manifold and nozzle connection thereto.

Referring to the drawing, the apparatus which we have illustrated as embodying the principles of this invention, comprises a welding unit A and a work-preheating unit B mounted on carriages C and D, respectively, the carriages being so connected that they may be propelled over a seam M to be welded in the work W, with the preheating unit B ahead of the welding unit A. In accordance with this invention, in order to maintain the preheating unit B in close proximity to and at a constant distance from the work W, the units A and B are joined by a link member E which is pivotally connected to the respective carriages C and D. By this construction, the welding unit A can be rockably moved to perform the welding operation without affecting or disturbing the distance of the preheating unit B from the work W.

The welding unit A is supplied with a suitable heat-producing gas, such as a mixture of oxygen and acetylene, through a gas-mixing handle L which is secured to the outer end of a stem S, the opposite end of which is directly connected to a welding head H mounted on the carriage C. A rod guide G for guiding a welding rod R into the welding region is mounted on the carriage C and supported on the head H. A main welding nozzle 10 and a welding rod-preheating nozzle 11 are threadedly secured to the head H at suitable angles so that the main welding and preheating jets produced by the nozzles will be projected onto the welding region and rod R, respectively.

The carriage C is provided with arms 13 extending outwardly and rearwardly from the sides of the head H, which arms cooperate with vertical threaded supports 14 to which are secured runners 15 adapted to be slidably moved over the surface of the work W. These supports 14 are adjustable vertically with respect to the arms 13, being carried in tubular mountings or blocks 16 detachably joined by a cross-bar 17. The supports 14 may be fixed in any desired vertical position by lock nuts 18 and 19 bearing against the upper and lower sides of the mountings 16. The supports 14 are also adjustable angularly with respect to the work W by sleeves or bearing members 20 secured to the ends of the arms 13 and to crossbar 17, the outer ends of which bearing members have milled surfaces adapted to cooper-

are replaced by blanks. However, any desired amount of preheat may be obtained by employing the required number of nozzles and tips to produce the temperature to which the work is to be raised preparatory to welding.

When all or a majority of the nozzles 30 are arranged to deliver preheating jets it frequently becomes necessary to provide a shield 82, as shown in Fig. 1, to prevent back-firing by conducting heat away from the nozzles, and dissipating it. The shield 82 in the form shown comprises a channel-shaped member of sufficient length and width to enclose the nozzles 30 and having openings 83 into which the ends of the burner tips may closely fit, to permit jets of gas to pass uninterrupted to the work. The shield 82 is suitably supported, as by suitable bracket members 84 secured upon the manifolds through connecting hooks 85 suspended from the braces 84 and inserted into apertures in the shield.

It will be appreciated that in the manipulation of the apparatus during a welding operation the carriage D will remain on the work while the carriage C is rocked about an axis between the supports as the welding flame is moved to form the weld. The member E swivels both at the point of juncture with the carriage C and where it is loosely connected with the cross member 33, thus permitting vertical swinging movement of the carriage C without corresponding movement on the part of the unit B.

A chain N is employed between the stem S and the crossbar 34 of the carriage D in order that the forward guiding wheel 49 may be lifted over tack welds or other obstacles in the weld V as the apparatus is moved forward during the welding operation. Sufficient length may be given to the chain N to freely permit the usual slight rocking motion of the stem S in manipulating the carriage C.

It will be understood that although a preferred form of this invention has been illustrated and described, wide variations may be made from such form without departing from the principles of the invention.

We claim:

1. In welding apparatus, the combination with a welding torch, of a preheating unit having at least one heat producing nozzle, means providing a flexible connection between said welding torch and said preheating unit whereby the preheating unit continuously remains in regulated proximity to the work independently of variations in the distance of the said torch from the work during a welding operation.

2. In welding apparatus, the combination with a welding torch, of a preheating unit, said preheating unit comprising a carriage supported on the surface of the work, means providing a flexible connection between the welding torch and said carriage, said connection permitting movement of said welding torch with respect to said preheating unit during a welding operation, and means supported by said carriage for uniformly preheating the work ahead of the welding torch.

3. In apparatus of the class described, the combination of a welding unit having a source of welding heat supported on a carriage; a preheating unit having a source of preheat supported on a carriage and mounted for movement upon the work; and link means pivotally connecting said welding unit and said preheating unit and permitting movement of the former with respect to the latter during a welding operation.

4. In apparatus of the class described; the combination of a welding blowpipe mounted on a carriage; a second carriage supported on the work; means providing a flexible connection between said first-mentioned carriage and said second-mentioned carriage; said connection permitting movement of said first-mentioned carriage with respect to said second-mentioned carriage during operation of the apparatus; and means associated with said second-mentioned carriage for evenly preheating the work ahead of said blowpipe.

5. In apparatus of the class described; the combination of a structure adapted for use in welding two members together along a seam; a welding head mounted on said structure; a carriage adapted to be supported on the work; means providing a flexible connection between said welding head and said carriage whereby said welding head is independently movable toward and from the work during a welding operation; adjustable means supported by said carriage for preheating the members adjacent the seam; means adapted to supply gas to said welding head and to said preheating means; and means for moving the apparatus over the work.

6. In apparatus of the class described; the combination of a manually operable carriage; a welding blowpipe supported by said carriage; a second carriage arranged ahead of said first-mentioned carriage; means including a link member pivotally connected with both of said carriages; a gas manifold mounted on the second carriage; and a plurality of nozzles connected to said gas manifold and adapted to direct preheating jets against the work at preselected points on its surface.

7. In apparatus of the class described; the combination of a carriage having supports and a handle arranged to rockably move the carriage on said supports; welding means supported on the carriage; a second carriage; means providing a flexible connection between said second-mentioned carriage and first-mentioned carriage; said connection permitting movement of said first-mentioned carriage with respect to said second-mentioned carriage during a welding operation and maintaining said second-mentioned carriage in regulated proximity to the work; and adjustable means supported on the second-mentioned carriage for preheating the work to the temperature desired.

8. In apparatus for welding two members together along a seam; a preheating unit comprising a frame having a source of heat mounted thereon; means including upright members for continuously supporting said frame on the surface of the work and in regulated position above the work; one of said upright members having the lower end thereof adapted to contact the seam and guide the apparatus along the work; and adjustable means for elevating said frame and source of heat relative to the work.

9. In apparatus for welding two members together along a seam; a preheating unit comprising a carriage having a frame and upright members for supporting said unit on the surface of the work, a guiding wheel on one of said supporting members adapted to move along the seam and to guide said carriage; means supported on the carriage for projecting jets of gas along the two members being welded adjacent the seam; and means for vertically adjusting said frame and said gas-projecting means relative to the surface of the members being welded.

10. In apparatus of the class described; the combination of a preheating unit comprising a carriage supported on the surface of the work; at least one gas distributing member mounted on said carriage; means including nozzles connected to said member for directing jets of gas on the work; each of said nozzles being independently removable from said member; and means for adjusting the position of said member on the carriage.

11. In apparatus for welding two members together along a seam; the combination of a preheating unit comprising a carriage adapted to be guided along the seam; said carriage having longitudinal members and connecting lateral members; at least one gas distributing manifold arranged substantially parallel with the seam and supported on said lateral members; and means for adjusting said manifold along said lateral members with respect to said carriage and the seam.

12. In portable apparatus of the class described, the combination of a heating unit comprising a carriage adapted to be supported on the surface of the work for universal movement thereover; two gas distributing manifolds mounted on said carriage for independent lateral positioning thereon; and means including nozzles connected to each manifold for directing jets of gas on the work; each of said nozzles being independently removable from the manifold to which it is connected.

13. In apparatus of the class described, the combination of a heating unit comprising a carriage adapted to be supported on the surface of the work; at least one gas distributing manifold mounted on said carriage; means including nozzles connected to said manifold for directing jets of gas on the work; and a shield enclosing said nozzles and displaced from said manifold for conducting heat away from the nozzles, said shield being carried by said carriage and having openings therein to permit jets of gas to pass uninterruptedly to the work.

14. In apparatus for welding two members together along a seam, the combination of a heating unit comprising a carriage adapted to be supported on the surface of the work; at least one gas distributing manifold mounted on said carriage; means including nozzles connected to said manifold for directing jets of gas on the work; and a guiding wheel of said carriage adapted to move along the seam and to guide said carriage.

15. In apparatus of the class described; the combination of a welding unit comprising a source of heat mounted on a carriage; a preheating unit comprising at least one gas conducting manifold and a carriage; said manifold being adjustable relative to said last-mentioned carriage; and means including a conduit for flexibly connecting said source of heat and said manifold.

16. Welding apparatus comprising, in combination, a work-preheating unit; a welding unit comprising a welding-rod guide, a welding-rod preheating nozzle, and a welding nozzle; and supporting means for said units so constructed and arranged that said nozzles may be adjusted, during the welding operation, relatively to the work and the welding rod but independently of said work-preheating unit.

17. A portable self-supporting welding apparatus comprising in combination, a work-preheating unit; a welding unit comprising a welding-rod guide, a welding-rod preheating nozzle, and a welding nozzle; means whereby said units may be stably supported upon the work for simultaneous movement along the surface thereof; and means whereby said nozzles may be adjusted, during the welding operation, relatively to the work and the welding rod but independently of said work-preheating unit.

18. In apparatus of the class described, a preheating unit and a welding unit, a link member adapted to be pivotally interconnected with the preheating unit at a plurality of selected points therein, and also with the welding unit, a welding head mounted on the welding unit, a plurality of nozzles carried by the preheating unit and supported with their lower ends adjacent a seam to be welded, and means for adjusting the said nozzles laterally of the seam to be welded.

19. In apparatus of the class described, a welding unit and a cooperatively inter-associated preheating unit, means pivotally connecting the welding unit with the preheating unit for free rocking movement of the former in a vertical plane independently of movement of the preheating unit, nozzles connected with the preheating unit and adapted to extend to a selected position adjacent the work being welded, means for adjusting the nozzles laterally of the seam being welded, and means for adjusting the distance between the welding unit and the said preheating nozzles.

20. Apparatus for use in welding two members together along a seam, comprising a welding unit mounted on a carriage, a preheating unit mounted on a second carriage, a member freely connecting the said carriages for free swinging movement with respect to each other during a welding operation; and means for regulating the distance between said carriages.

21. Apparatus for use in welding two members together along a seam, comprising a welding unit mounted on a carriage; a preheating unit mounted on a second carriage; a floating member freely pivoted to each of the said carriages thereby permitting uninterrupted free swinging movement of one carriage with respect to the other during a welding operation; and means associated with the floating member for regulating the distance between the said carriages.

22. In apparatus of the class described, the combination of a welding unit comprising a source of heat mounted on a carriage, a preheating unit comprising at least one gas-conducting manifold and a second carriage therefor, a plurality of preheating nozzles, and means connecting each of the said nozzles with the manifold, the said means including a plurality of spaced pairs of aligned apertures in opposite walls of the manifold, and a plurality of pairs of interfitting seating and clamping members, one of the said members of each pair thereof having a channel therethrough in open communication with the interior of the manifold and with one of the respective nozzles.

23. In apparatus of the class described, the combination of a welding unit comprising a source of heat mounted on a carriage, a preheating unit comprising at least one gas-conducting manifold and a carriage therefor, a plurality of preheating nozzles, and means connecting each of the said nozzles with the manifold, the said means including a plurality of spaced pairs of aligned apertures in opposite walls of the manifold and a plurality of pairs of interfitting seating and sealing members, the respective members of each pair extending through opposite walls of the manifold at each pair of aligned apertures, and having threaded engagement between each other, one of the members of each pair having therein a conduit connecting the manifold interior with a respective nozzle.

24. In apparatus of the class described, the combination of a carriage having supports, and means adapted when actuated to rockably move the carriage upon the said supports, welding means mounted on the carriage, a second carriage, means providing a loose flexible connection between said second-mentioned carriage and said first-mentioned carriage, a plurality of preheating nozzles carried by the second carriage, and independent supports for the second carriage adapted to be moved along and upon the work, whereby the second carriage continuously is supported on the work with the preheating nozzles in regulated proximity to the latter during rocking movement of the first-mentioned carriage.

25. In welding apparatus, the combination of a preheating unit comprising a carriage adapted to be propelled along the surface of the work, and work-preheating means mounted on said carriage; a welding unit comprising a second carriage adapted to be propelled along the surface of the work, and welding means mounted on said second carriage; and means connecting said carriages whereby said units may be propelled in unison along the work.

26. In welding apparatus, the combination of a preheating unit comprising a carriage adapted to be propelled along the surface of the work, and work preheating means mounted on said carriage; a welding unit comprising a second carriage adapted to be propelled along the surface of the work, and welding means mounted on said second carriage; and means connecting said carriages; said connecting means being so constructed and arranged that said units may be moved along the work in unison and one carriage may be adjusted relatively to and independently of the other.

27. In welding apparatus, the combination of a preheating unit comprising a carriage adapted to be propelled along the surface of the work, and work preheating means mounted on said carriage; a welding unit comprising a second carriage adapted to be propelled along the surface of the work, and welding means mounted on said second carriage; and means connecting said carriages whereby said units may be propelled in unison along the work, said connecting means being so constructed and arranged that said welding unit may be moved away from or toward the work independently of said preheating unit and while the entire apparatus is being propelled along the work.

28. In apparatus for delivering heat to work, the combination of a heating unit comprising a carriage adapted to be propelled along the surface of the work, and work heating means mounted on said carriage; a second heating unit comprising a second carriage adapted to be propelled along the surface of the work, and heating means mounted on said second carriage; and means connecting said carriages whereby said heating units may be propelled in unison along the work.

29. In apparatus for delivering heat to work, the combination of a heating unit comprising a carriage adapted to be propelled along the surface of the work, and work heating means mounted on said carriage; a second heating unit comprising a second carriage adapted to be propelled along the surface of the work, and heating means mounted on said second carriage; and means connecting said carriages whereby said heating units may be propelled in unison along the work; said connecting means being constructed and arranged to permit one of said heating units to be moved away from or toward the work independently of said other heating unit and while the entire apparatus is being propelled along the work.

30. In apparatus for delivering heat to work, the combination of a heating unit comprising a carriage adapted to be propelled along the surface of the work, and work heating means mounted on said carriage; a second heating unit comprising a second carriage adapted to be propelled along the surface of the work, and heating means mounted on said second carriage; and means connecting said carriages whereby said heating units may be propelled in unison along the work; said connecting means being so constructed and arranged that one carriage may be adjusted relatively to and independently of the other.

31. Apparatus for heating metal work comprising, in combination, a pair of parallel gas distributing manifolds disposed side by side; means whereby said manifolds are laterally adjustable relative to each other and maintained in said parallel and side by side relation; a plurality of nozzles secured to each manifold, for directing jets of gas against the work; and a carriage for supporting said manifolds and said nozzles at a uniform distance from the work.

H. E. ROCKEFELLER.
J. M. HALBING.